(No Model.)　　　　　　　O. W. BENSTER.　　　4 Sheets—Sheet 1.
WIND ENGINE.
No. 463,092.　　　　　　　Patented Nov. 10, 1891.
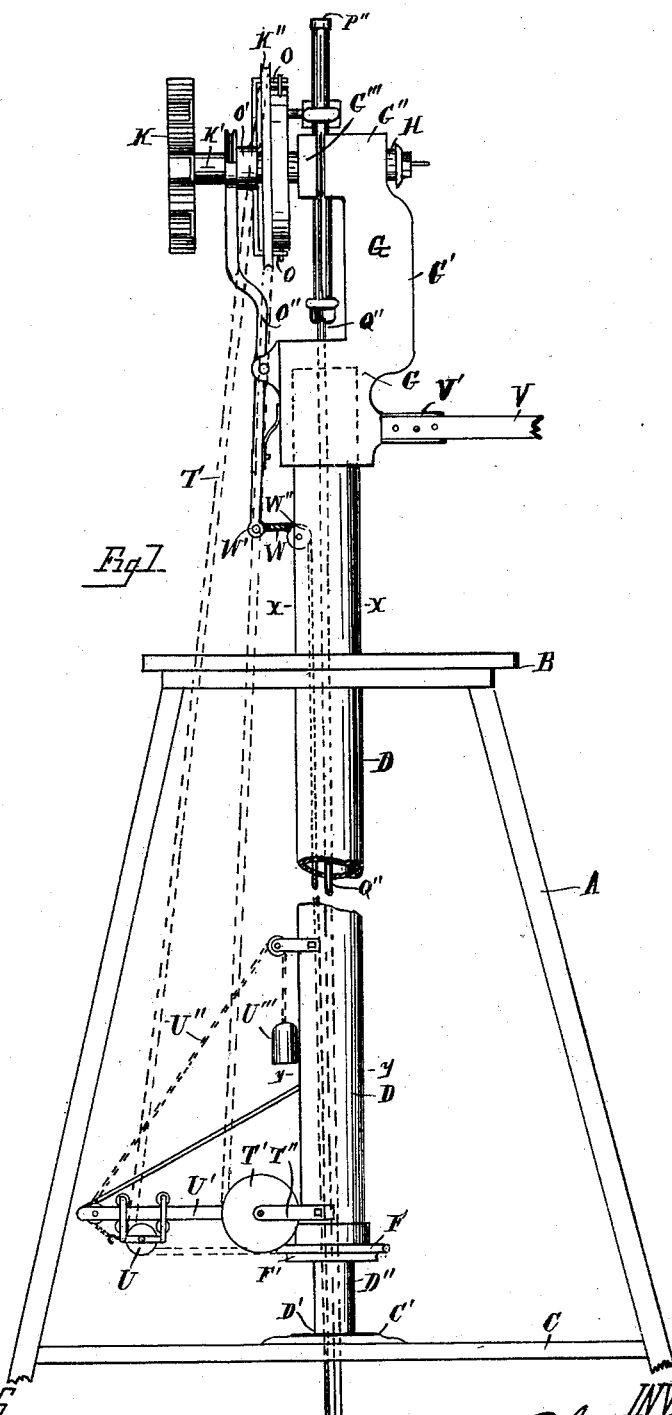
WITNESSES　　　　　　　　　　　　　　　　INVENTOR
Carroll J. Webster.　　　　　　　　　　　Olin W. Benster
Anna J. Lehaney.　　　　　　　　　By William Webster
　　　　　　　　　　　　　　　　　　　　　　Atty

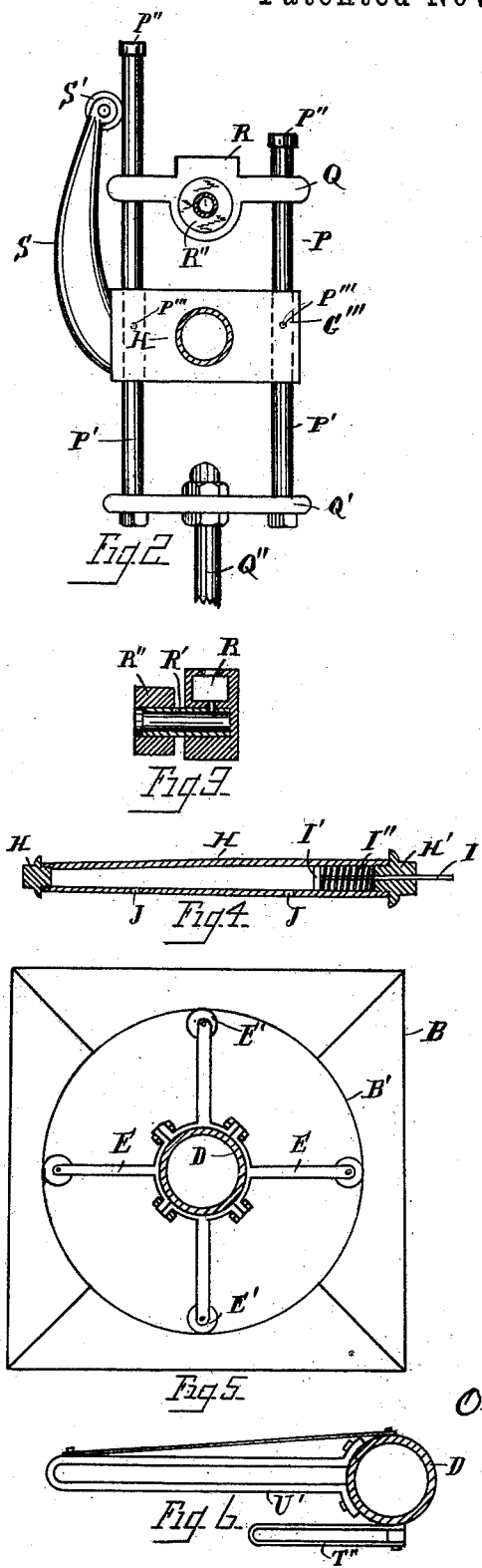

(No Model.)

O. W. BENSTER.
WIND ENGINE.

No. 463,092.

4 Sheets—Sheet 3.

Patented Nov. 10, 1891.

WITNESSES
Carroll J. Webster.
Anna J. Delaney.

INVENTOR
Olin W. Benster
By William Webster
Atty (No Model.) 4 Sheets—Sheet 4.
O. W. BENSTER.
WIND ENGINE.
No. 463,092. Patented Nov. 10, 1891.

WITNESSES
Carroll J. Webster.
Anna J. Dehaney.

INVENTOR
Olin W. Benster
By William Webster
Atty

UNITED STATES PATENT OFFICE.

OLIN W. BENSTER, OF TOLEDO, OHIO.

WIND-ENGINE.

SPECIFICATION forming part of Letters Patent No. 463,092, dated November 10, 1891.

Application filed April 22, 1889. Serial No. 308,161. (No model.)

*To all whom it may concern:*

Be it known that I, OLIN W. BENSTER, a citizen of the United States, residing at Toledo, in the county of Lucas and State of Ohio, have invented certain new and useful Improvements in Wind-Engines; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to wind-engines, and has especial reference to the transmission of power from the wind-wheel to any mechanism that it may be desired to operate thereby.

The objects of the invention are, first, to construct a power-gearing whereby the power transmitted by the wheel to the axis thereof may be applied to a rotary motion or converted into a reciprocating movement of a pitman, or, if desired, to an intermittent reciprocating movement of the same, or to a rotary and reciprocating motion at the same time.

A further object is to so gear from the axis of the wind-wheel that the power shall be direct therefrom, regardless of the horizontal movement of the wheel upon the derrick in turning to the wind.

A further object is to mount the wind-wheel and power-gearing upon a revoluble standard that shall move in a horizontally rotary manner in unison with the vane or wind-wheel in throwing the wheel to the wind by which to avoid lost motion in gearing direct with the wind-wheel.

A further object is to construct the bearings for the revoluble parts of the power with means for supplying a uniform feed of lubricant from a quantity stored within the axis of the same; and, finally, a further object is to provide a derrick and standard so constructed that either a solid wheel and hinged vane, or a wheel with a feathering-blade and solid vane, may be used.

Figure 7:
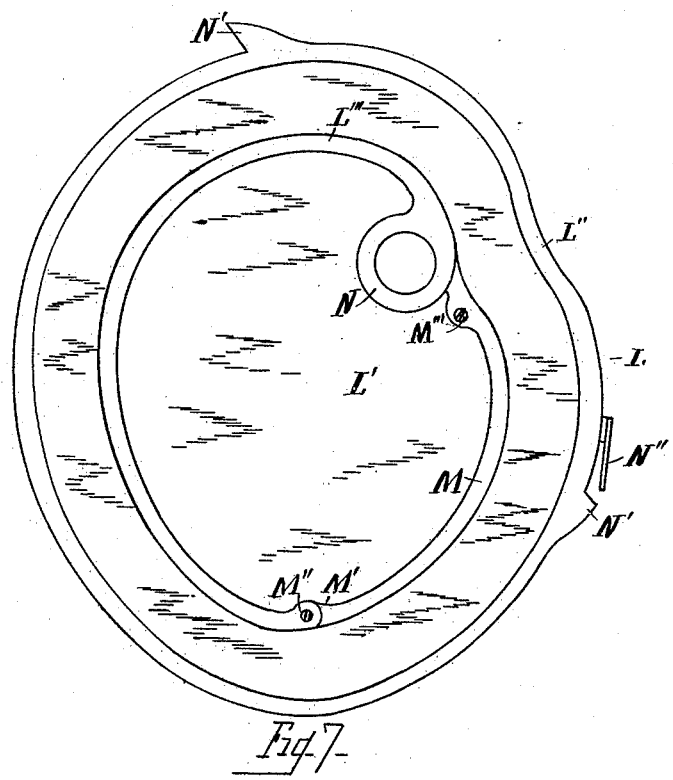
Figure 8:
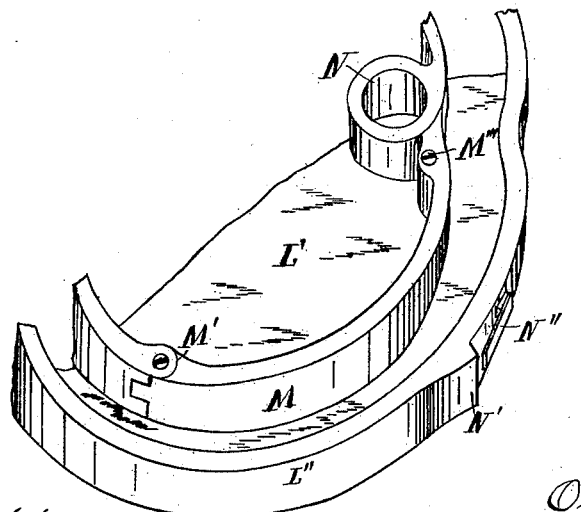
Figure 9:
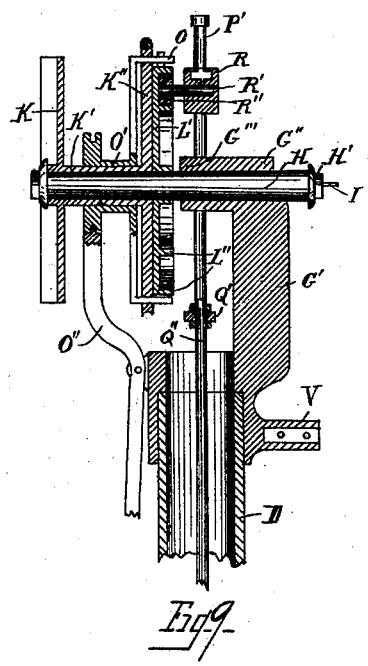

In the drawings, Figure 1 is a front elevation of a portion of the derrick having a standard revolubly journaled therein and upon which is secured the power and power-transmitting mechanism. Fig. 2 is a detail view of the pitman-guide and cross-head. Fig. 3 is a longitudinal vertical sectional view of the self-lubricating journal for the anti-friction roller upon the pitman. Fig. 4 is a like view of the journal upon which the wind-wheel revolves. Fig. 5 is a plan view of the standard journaled within the derrick, showing the quadrant-arms and anti-friction rollers bearing upon an annulus secured to the platform of the derrick, this view being taken on line $x\ x$, Fig. 1. Fig. 6 is a plan view of the track and brace secured to the standard and upon which the tension device is mounted, showing also the hanger for idler over which the belt-gearing is led in gearing for rotary motion, this view being taken on lines $y\ y$, Fig. 1. Fig. 7 is a plan view of a convertible cam. Fig. 8 is a perspective view of a portion of the same, showing in detail the removable section by which the wiper-wheel is converted into a cam, the two last-named views being drawn on an enlarged scale. Fig. 9 is a longitudinal vertical section through the power-gearing.

A designates the derrick; B, the top of the same, upon which is secured an annulus B' of slightly greater diameter than the opening B' (shown in dotted lines in Fig. 5) through the top of the derrick.

C designates a platform near the lower portion of the derrick, upon which is secured a plate C', into which the base D' of a standard D rests in a manner to allow the standard to revolve within the plate, the standard being held vertically within the derrick by means of quadrant-arms E, secured to the standard and extending radially therefrom a distance to cause anti-friction rollers E', journaled within the quadrant-arms E, to bear against the inner side of the annulus B', whereby the standard is held vertically and allowed to revolve freely within the derrick.

For lightness and strength I prefer to use a metal pipe for standard D and secure the lower end into the socket of base D', the base being formed with a reduced cylindrical lower portion D'', upon which is journaled two pulleys F and F', respectively, the two pulleys being connected to revolve in unison for a purpose hereinafter stated.

G designates the power-casting having a socketed lower end into which the upper end of standard D is secured, by which means the power-casting, standard, and base revolve in unison when moving to throw the wind-wheel to or from the wind. From one side of the socketed end of the power-casting there is extended vertically an arm G', having an angled boss G" at the upper end, the face of the boss G" being in alignment with the center of the hollow standard.

H designates a tubular axle secured in the upper portion of the standard and boss at right angles to the same, the axle being formed with screw-threads at each end closed by screw-threaded nuts H', the removability of the same allowing of access to the interior of the axle to place the lubricant therein. The nut of the rear end of the axle is perforated centrally to allow the stem I of a plunger I' to pass through the same.

I" designates a spiral spring interposed between the rear face of the plunger and nut H', whereby the plunger is urged forward normally to cause an even feed of lubricant through perforations J in the axle.

K designates the spider or arms of the wind-wheel formed integral with a hub K' and band-pulley K", the whole revolving freely upon axle H and lubricated through perforations J of the same.

L designates a convertible cam comprising the back plate L', peripheral flange L", and (when used to produce an intermittent reciprocatory movement) the wiper L''', these parts being preferably cast integral.

When it is desired to produce a rectilinear reciprocation, the wiper is converted into a cam by means of a filling-piece M, secured to the wiper by a joint M', held in place to the back plate by a bolt, pin, or rivet M", passed through the joint and back plate, the other end of the filling-piece being held in place by a bolt, pin, or rivet M''', passed through the end of the same and secured into the back plate.

N designates the bearing of the back plate through which the axle H is passed, and N' designate lugs upon the outer edge of the back plate for the purpose of causing the revolution of the same when in engagement with arms O, secured to a collar O', moving upon hub K' when actuated by a shifter O", the arms O being passed through band-pulley K" and revolving with the same.

P designates the pitman-guide, comprising vertical tubular rods P', reciprocating in a guideway formed in boss G" and coincident grooves formed in a plate G''', secured to the boss. The tubular guide-rods P' are closed at their upper ends by caps P", the guide-rods being filled with lubricant which finds an egress through perforations P''', (shown in dotted lines in Fig. 2,) whereby the guideway is lubricated at all times, and a sufficient quantity of lubricant is stored to last for a considerable time. The two guide-rods P' are secured to upper and lower cross-heads Q and Q', respectively, the lower cross-head having a pitman Q" secured thereto in alignment with and reciprocating within the tubular standard D. The upper cross-head is formed with an oil-cup R, communicating with a tubular journal R', secured within the cross-head, and upon which is journaled an anti-friction roller R" of a diameter to revolve within the track of the cam. The end of the journal R', upon which the roller revolves, is closed by a cord or other porous substance (not shown) that will allow the lubricant to feed not only to the roller, but to this back plate and track of the cam, thereby keeping the same uniformly lubricated.

S designates an arm extending from boss G" in substantially parallel relation with one of the guide-rods P' and having an anti-friction roller S' journaled in the end thereof and adapted to bear against the rod to support the same against lateral strain.

T designates a belt running from pulley K" to a pulley F upon the lower portion of the base D' of standard D, one portion of the belt passing from the pulley K" in substantially parallel relation with the standard and around an idler T', journaled in a hanger T", secured to standard D, the other portion of the belt passing around an idler U, journaled in a hanger moving upon tracks U', radiating from the standard, and to which is secured a rope U" and weight U''' by which to tighten the belt.

V designates the vane-shaft, secured to the power-casting at V' to cause the same to revolve to throw the wheel to the wind.

W designates a rope connected with the shipper at W' and passed over a pulley W", journaled in the standard and extending downwardly through the tubular standard to a position to be grasped when it is desired to withdraw arms O from engagement with lugs N' to convert the motion from a reciprocating or intermittently-reciprocating motion to a circular motion.

In operation, the nut H' upon the end of axle H is unscrewed and the axle is filled with a lubricant, preferably tallow, until the plunger I' is urged against the pressure of the spring to a retracted position against the rear nut H', thereby insuring an even feed of lubricant by reason of the pressure of the plunger upon the same as the supply decreases. The cup R is also filled with a supply of lubricant, and if it is desired to communicate a rotary motion from the wind-wheel rope W is pulled upon, thereby causing the shipper to withdraw arms O from lugs N' and the plate L remains stationary, power being communicated from band-pulley K" to pulley F through the medium of belt T, and by reason of pulleys F and F' being connected to revolve in unison power may be communicated to any desired mechanism by a belt running upon pulley F' and to the same.

If it is desired to communicate a reciprocatory motion to the pitman—as, for instance, for the purpose of pumping, the filling-piece being in place, as shown in Fig. 7—the tension upon the rope is relaxed and the shifter is caused to project the arms in the path of the lugs N', (the springs N'' receiving the impact to prevent too sudden strain upon the lugs,) and the cam is revolved with the wind-wheel, causing the anti-friction roller R'' to rise and fall with the eccentricity of the cam and cause the desired reciprocation to the pitman.

Should an intermittently-reciprocating motion to the pitman be desired—as, for illustration, to actuate a drill—the filling-piece M is removed, thereby converting the cam into a wiper-wheel, with the effect of causing an intermittent reciprocation to the pitman, inasmuch as the said pitman will be raised by the wiper L''' until it reaches the space caused by the removal of the filling-piece, when it will drop by gravity to be again raised as the cam revolves. Should it be desired to operate both the circular and reciprocating motion, the arms are permitted to engage with the lugs, the belt T is run upon the pulleys K'' and F passing over the intermediate idlers, and both motions are transmitted from the wind-wheel.

What I claim is—

1. In a wind-engine, the combination of a wind-wheel, a band-pulley formed integral therewith, a cam, movable arms mounted upon the wind-wheel, and mechanism for moving the said arms into and out of engagement with the cam, whereby both rotary and reciprocating motions are derived from the power of the wind-wheel.

2. In a wind-engine, a wind-wheel, a convertible cam, and mechanism connecting the same with the wind-wheel, in combination with a pitman adapted to be reciprocated by the revolution of the said cam.

3. In a wind-engine, a wind-wheel, a band-pulley carried thereby formed with transverse perforations, arms passed through the perforations and connected with a shifter, a cam-plate mounted upon the same axis with the wind-wheel, and a pitman connected with the cam, as and for the purpose set forth.

4. In a wind-engine, a wind-wheel and a cam-plate carried by the shaft thereof, said plate being provided with a wiper having a detachable filling-piece, as and for the purpose set forth.

5. In a wind-engine, a cam mounted upon the wind-wheel shaft, a pitman connected with the cam, and movable arms mounted upon the wind-wheel hub to engage with the cam and cause the same to move in unison with the wind-wheel, as and for the purpose set forth.

6. In a wind-engine, a tubular standard journaled within the derrick-frame and a pitman inclosed within the standard, in combination with a pitman-guide formed with an anti-friction roller journaled upon an axis secured to the cross-head of the same and operating to cause a reciprocation of the pitman when actuated by a cam revolving with the wind-wheel, as and for the purpose set forth.

7. In a wind-engine, in combination with a wind-wheel hub, an axle for the same provided with a central chamber having perforations in communication with the wheel-hub, and a spring-pressed plunger to urge the lubricant through the perforations, as and for the purpose set forth.

8. In a wind-engine, a pitman-guide, a cross-head thereon formed with a lubricant-receptacle, a tubular journal secured in the cross-head in communication with the oil-receptacle, and an anti-friction roller upon the journal, in combination with a cam-plate in which the roller revolves, the roller and cam-plate receiving lubricant from the lubricant-receptacle, as and for the purpose set forth.

9. In a wind-engine, the combination, with the wind-wheel shaft, of mechanism for imparting either a constant or intermittent reciprocatory movement to the pitman-rod, consisting of a convertible cam, substantially as described.

10. In a wind-engine, a pitman-guide comprising upper and lower cross-heads and vertical guide-rods, said guide-rods reciprocating in ways formed one upon each side of the wind-wheel axis, a pitman secured to the lower cross-head in vertical alignment with the guide-rods, and an anti-friction roller journaled upon the cross-head and traveling upon a track connected with the wind-wheel, as and for the purpose set forth.

11. In a wind-engine, a tubular standard, a power mechanism supported thereon having a pulley, a horizontal pulley journaled at the base of the standard, and a belt upon said pulley, one portion of which is guided by an "idler," the opposite portion being put in tension by a tightener-pulley.

In testimony that I claim the foregoing as my own I hereby affix my signature in presence of two witnesses.

OLIN W. BENSTER.

Witnesses:
WILLIAM WEBSTER,
CARROLL J. WEBSTER.